United States Patent Office 3,010,868
Patented Nov. 28, 1961

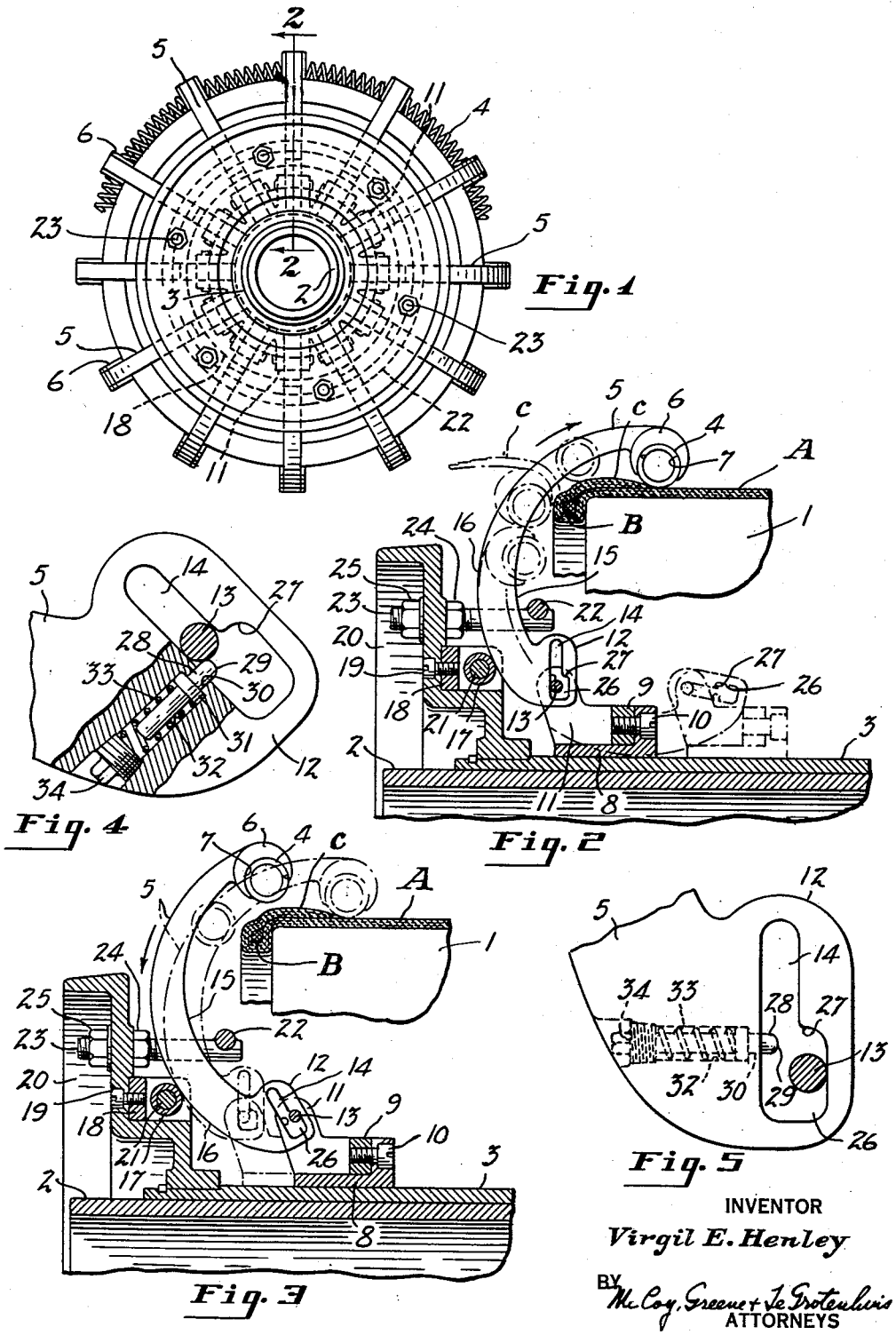

3,010,868
DEVICE FOR CUFFING AN END OF A FABRIC BAND OVER AN ENDLESS BEAD RING
Virgil E. Henley, Akron, Ohio, assignor to The General Tire & Rubber Company, Akron, Ohio, a corporation of Ohio
Filed July 16, 1958, Ser. No. 748,927
1 Claim. (Cl. 156—400)

This invention relates to a device for cuffing an end of a fabric band over an endless bead ring and more particularly to a cuffing device of the endless elastic stitcher ring type.

The device of the present invention is applicable to the building of pneumatic tire casings by the method disclosed in the patent to McMahon, 2,838,092, June 10, 1958, in which a fabric band is placed upon a substantially cylindrical drum with ends projecting past the ends of the drum, in which endless inextensible bead rings are placed around the projecting ends of the band and in which elastic stitcher rings are expanded within the portions of the band extending beyond the bead rings and are then moved axially inwardly over the rings and drum ends to cuff the fabric over the rings and stitch the same to the outer face of the fabric band on the drum.

The device of the present invention provides an improved stitcher ring actuating mechanism in which the required movements are transmitted to the stitcher ring through a series of supporting members in the form of swinging arms having axial and radial movements and in which means is provided for so controlling the movements of the ring supporting members that engagement of the stitcher ring with the fabric is positively prevented during the axial outward movement of the stitcher ring following its inward stitching stroke.

The invention has for its object to provide a simple and effective means of connecting the arms to an axially movable actuating member in such manner as to insure that all the arms swing simultaneously about a pivot that is at a predetermined distance from the elastic stitcher ring carried by the outer ends of the supporting members during the portion of the movement of the actuator during which the stitcher ring is moving axially outwardly to a position clear of the fabric band, the radial distance between the pivots and the ring being such that the stitcher ring is held clear of the fabric during such outward movement.

Reference should be had to the accompanying drawings forming a part of this specification, in which:

FIGURE 1 is an end elevation of the device;

FIG. 2 is a fragmentary section taken on the line indicated at 2—2 in FIG. 1, showing in full lines the actuator, the stitcher ring and one of the supporting members in the positions which they occupy at the completion of the stitching stroke, and showing in dotted lines the same parts in their retracted positions;

FIG. 3 is a section similar to FIG. 2, showing in full lines the stitcher ring, supporting arm and actuator in a position through which they pass during the return stroke of the actuator;

FIG. 4 is a fragmentary enlarged view of the inner end of one of the ring supporting members, showing the pin and slot pivot connection between the actuator and one of the supporting members, the supporting member being shown in an intermediate position; and FIG. 5 is a fragmentary view similar to FIG. 4, showing the positions occupied by the pin slot and detent at the beginning of the return movement of the stitcher ring.

The accompanying drawings show mechanism for cuffing one end of a fabric band that has been placed on a tire building drum over a bead ring that encircles said end of the band, it being understood that the mechanism is duplicated at the opposite end of the drum as shown in Patent 2,838,091 above referred to.

As shows in FIG. 2, a fabric band A is placed on a tire building drum 1 and an endless inextensible bead ring B is placed around the end portion C of the band that projects beyond the drum 1. As shown in FIGS. 2 and 3, the bead ring B is inset with respect to the drum periphery and engages a portion of the band overlying the drum shoulder. This positioning of the bead ring may be accomplished by expanding the drum to stretch the portion of the fabric lying on the drum periphery after the bead ring has been positioned around the portion of the band beyond the end of the drum and adjacent thereto. The building drum is carried by a rotatable supporting shaft 2, being attached to a sleeve 3 that turns with the shaft. The end C of the band is cuffed over the bead ring B by means of an elastic extensible stitcher ring 4 which may be in the form of an endless garter spring. The stitcher ring is supported upon a series of angularly spaced longitudinally curved supporting members 5 that are mounted to move axially in planes that include the drum axis, and angularly toward and away from said axis. The supporting members 5 have enlarged spring supporting outer end portions 6 that are provided with sockets 7 to receive and retain the ring 4. The supporting members 5 are connected at their inner ends to an axially movable actuating member 8 that is of annular form and coaxial with the drum 1. The member 8 may be in the form of a collar slidably mounted on the sleeves 3. The actuating member 8 has hinge brackets 9 attached thereto by screws 10. The brackets 9 are closely and regularly spaced circumferentially of the collar 8 and each is provided with outwardly projecting hinge knuckles 11. The opposing faces of the knuckles 11 of each hinge bracket are parallel and each supporting member 5 has an enlarged inner end portion 12 that fits between the parallel faces of the knuckles 11 of one of the hinge brackets 9 and each supporting member 5 is pivotally connected to its hinge bracket 9 by a transverse hinge pin 13 attached to and extending across the space of the knuckles 11 and through an elongated slot 14 in the enlarged inner end 12 of the supporting member. The pins 13 are disposed at right angles to the inner faces of the knuckles 11 and to the axis of the drum 1 and preferably with their axes substantially in a plane perpendicular to said axis.

The supporting members 5 are initially held by the collar 8 in retracted positions in which they extend in an axial direction with their stitcher ring supporting ends in their radially innermost positions where the ring 4 is supported within the projecting end C of a fabric band on the drum, the actuating member 8 being in its axially innermost position as shown in dotted lines in FIG. 2. The longitudinally curved supporting members 5 have a concave substantially arcuate longitudinal face 15 and a substantially arcuate convex longitudinal face 16, the convex faces 16 facing radially inwardly toward the drum axis and the concave faces 15 facing radially outwardly from the drum axis when the supporting members are in their axially extending retracted position. During outwardly axial movement of the collar 8 the supporting members 5 are guided to swing about the hinge pins 13 in radial outward directions and, in so moving, expand the elastic ring 4 against the interior of the projecting end C of the fabric band to expand it to a diameter greater than that of the bead ring and then to move the ring axially inwardly over the end of the drum to stitch the end C to the body of the band on the drum periphery. During the expanding and stitching operation the supporting members 5 are guided by rollers 17 that are mounted in fixed positions, one alined axially with each supporting member and engaging with the face 16 thereof when an axial thrust in an outward direction is applied to the arm by the actuating member 8. The rollers 17 are mounted in brackets 18 that are rigidly attached by suitable means such as screws 19 to a supporting disk 20 that is fixed to the sleeve 3. The brackets 18 are axially alined with the arm supporting hinge brackets 9 on the actuating member 8 and each roller 17 is mounted on a shaft 21 carried by a bracket 18, the shafts 21 being parallel with the pivot pins 13 carried by the axially alined hinge brackets 9.

While the actuating member 8 is being moved axially outwardly from the dotted line position shown in FIG. 2, the pins 13 engage the inner ends of the slots 14 and exert a thrust on the inner ends of the supporting members 5 in an axial outward direction while the elastic ring 4 exerts a radial inward thrust on the outer ends thereof. The thrust of the actuating member and of the stitching ring 4 on the supporting members 5 maintains the convex faces 16 of the supporting members 5 in engagement with the rollers 17. The curvature of the faces 16 of the supporting members 5 is such that the ring 4 is first expanded to a position alongside the bead ring B and then moved inwardly toward the drum to press the expanded end of the band against the bead ring and drum shoulder. As the stitcher ring rides over the bead ring and tire shoulder, the thrust of the ring 4 against the bead ring and drum has a radial outward component that imparts an endwise outward movement to the supporting members 5 that causes a relative movement of the pins 13 with respect to the slots 14 that brings the hinge pins 13 into the lower end portions of the slots 14 which, as shown in FIG. 2, move angularly with the supporting members 5 to a position transverse to the drum axis as the actuating member 8 approaches its outermost position. The elastic stitcher ring 4 maintains a substantial radial inward pressure on the end portion C of the fabric band as it moves axially inwardly over the end portion of the drum, so that it irons out wrinkles and firmly stitches the cuffed end of the band to the body thereof on the drum periphery.

Upon axial inward movement of the actuating member 8 after completion of the stitching stroke, the movement of the supporting members 5 and ring 4 is reversed, to return the same to their retracted positions and means is provided for expanding the ring 4 out of contact with the fabric and for retaining it out of contact with the fabric during such return movement. The expansion of the ring 4 at the beginning of the return movement of the actuating member 8 is effected by causing the supporting members 5 to pivot about the pins 13 while the pins 13 are held against longitudinal movement in the slot 14. To initiate the outward swinging movement of the supporting members, a fixed annular abutment is provided in the form of a ring 22 coaxial with the drum and surrounding the inner ends of the supporting members 5 axially inwardly thereof. The ring 22 is preferably round in cross section and is attached to the inner ends of angularly spaced axially extending pins 23 rigidly attached to the supporting disk 20. The outer ends of the pins 23 are threaded and each pin is adjustably secured to the disk 20 by means of nuts 24 and 25 which engage the inner and outer faces of the disk.

For retaining the pins 13 in the inner end portions of the slots 14 during the initial portion of the return movement of the actuating member 8, each slot has an enlargement 26 at its inner end that provides a shoulder 27 on the side of the slot that is axially innermost when the supporting members are in their radial positions shown in full lines in FIG. 2, with which the pins 13 engage to hold the supporting members against radially inward endwise movement. Upon an inward axial movement of the actuating member 8 from the position shown in full lines in FIG. 2, the pins 13 are moved axially across the enlarged portion 26 of the slot 14 and into engagement with the inner side of the enlarged portion 26 and into radial alinement with the shoulder 27. Further movement of the actuating member 8 swings the inner ends of the supporting members 5 inwardly about the points of engagement of the portions of the ring 4 within the ends 6 of the arms with fabric on the drum 1, until the faces 15 of the supporting members are engaged with the abutment ring 22, whereupon further movement of the actuating members causes the supporting members 5 to pivot about the pins 13 and expand the ring 4 out of contact with the fabric. When moved out of contact with the fabric, the ring 4 exerts a radial inward thrust on the supporting members 5 which tends to move them radially inwardly, but this movement is prevented by engagement of the shoulders 27 with the pins 13. During the movement of the pins 13 across the enlarged portions 26 of the slots and during movement of the supporting members into engagement with the abutment ring 22 the radial inward thrust of the spring ring 4 is taken by the drum and there is no radial inward thrust on the members 5 so that if the pins 13 engage the inner walls of all of the slots prior to engagement of the members 5 with the abutment ring 22, all of the supporting members will be locked against inward movement. However, the weight of some of the supporting members or torsional forces set up in portions of the ring 4, may cause some of the supporting members 5 to move ahead of the others, so that the shoulders 27 of these members may not have full engagement with all the pivot pins and, unless means is provided to insure proper engagement, some of the arms may not be locked against radial inward movement and portions of the stitcher ring may engage with the fabric during the axial outward movement of the ring.

In order to insure engagement of the shoulders 27 with all of the pins 13 until the ring 4 has been moved axially outwardly to a position clear of the fabric band, a detent 28 in the form of a pin with a rounded inner end 29 is provided in the inner end portion 12 of each supporting member 5, each detent 28 being interposed between the pivot pin 13 and the outer wall of the slot 14 when the pin is engaged with the shoulder 27. The detent is slidably mounted in a bore 30 at right angles to the slot 14 and has an enlarged portion 31 in a counterbore 32 that is held against the inner end of the counterbore by a coil spring 33 interposed between the enlarged portion 31 of the detent and a threaded plug 34 that closes the outer end of the counterbore 32.

When the pins 13 engage the detent 28 and subject the detents to a thrust longitudinally of the slot 14, the detents 28 will yield and allow the pin to pass. The detents 28 are so positioned that they are pulled past the pivot pins 13 during the axial inward movement of the stitcher ring 4 so that the pins are disposed radially inwardly of the detent 28 at the end of the stitching stroke as shown in full lines in FIG. 2. The detents 28 are alined with the pins 13 when the pins 13 are in engagement with the shoulder 27 as shown in FIG. 3 and serve to prevent passage of any of the pins into the outer portion of the slot 14 during the initial portion of the axial outward movement of the stitcher ring.

After the actuating member 8 has moved inwardly a distance sufficient to move the stitcher ring clear of the drum, the shoulder 27 swings outwardly with respect to the pins 13 so that the thrust exerted on the members 5 by the stitcher ring 4 presses the detents 28 against the pins 13 with sufficient force to move the detents 28 past the pins 13, so that the pins 13 engage with the outer ends of the slots 14 when the actuating member 8 is again moved in the outward direction.

It is to be understood that in accordance with the provisions of the patent statutes, variations and modifications of the specific devices herein shown and described may be made without departing from the spirit of the invention.

What I claim is:

A tire building machine having a drum, an elastic stitcher ring, a series of angularly spaced radially swinging stitcher ring supporting arms, each having an elongated slot adjacent its inner end that moves to a position transverse to the drum axis when said members are swung outwardly, said slot having a shoulder adjacent its inner end that is on its axially innermost side when the slot is in said transverse position, an axially movable actuating member within and coaxial with said drum, a pivot pin for each of said arms that engages in the slot of its arm and that is attached to said actuating member, means for causing said arms to swing radially and toward the end of said drum upon an outward axial movement of said actuating member to expand said ring and move it over the end of the drum, means for reversing the angular movement of said arms upon reverse axial movement of said actuating member, the combination therewith of means for insuring engagement of all of said pins with said shoulders upon reverse movement of said actuating member and simultaneous and equal angular movements of the arms during the initial portion of the reverse angular movement of said arms comprising a spring pressed detent adjacent the shoulder of each slot that projects into the slot from the side opposite that having the shoulder and that is spaced from the shoulder a distance less than the diameter of the pivot pin, said detents being yieldable to pass said pins when endwise movements of said arms are unrestrained by said shoulders and pins.

References Cited in the file of this patent

UNITED STATES PATENTS

| | | |
|---|---|---|
| 2,313,035 | Breth | Mar. 9, 1943 |
| 2,409,974 | Breth | Oct. 22, 1946 |
| 2,455,038 | Breth | Nov. 30, 1948 |
| 2,464,020 | Breth | Mar. 8, 1949 |
| 2,488,863 | Haase | Nov. 22, 1949 |
| 2,838,092 | McMahon | June 10, 1958 |